UNITED STATES PATENT OFFICE.

TAMETARO TADA, OF TOKUSHIMA KEN, JAPAN.

PROCESS FOR PREPARING GELATIN.

1,271,960.    Specification of Letters Patent.    Patented July 9, 1918.

No Drawing.    Application filed June 1, 1918. Serial No. 237,823.

*To all whom it may concern:*

Be it known that I, TAMETARO TADA, subject of the Emperor of Japan, residing at No. 20 Kitagawa, Tori Machi, in the city of Tokushima, Tokushima Ken, Japan, have invented new and useful Improvements in Processes for Preparing Gelatin, of which the following is a specification.

This invention relates to an improvement in process for preparing gelatin, consisting in running into a mold gelatin fluid concentrated into a thickness of 30% or more by evaporating same in a vacuum pan or the like, and drying rapidly the gelatin thus solidified into thin sheets, by exposing them to a heat not lower than 40° C. The object of this invention is to obtain a process in which the time required for preparing gelatin is shortened and the growth of putrifying organisms is prevented, and which can be carried out in any season of the year.

There are several methods hitherto used for preparing gelatin, but in none of these known methods, the gelatin fluid extracted from a gelatin producing material is concentrated to any great strength, because if it is so concentrated, the solidified gelatin increasing in its viscosity, resists the wire knife or any other cutting instrument, and gives very rough, irregular and undulating cut surfaces, and the dried slices are liable to crack. Thus it is impossible to obtain gelatin sheets which are thin, lustrous and transparent. On the other hand, if gelatin fluid is allowed to retain such a large proportion of water as has hitherto been the case, the slices made therefrom after solidification melt again on exposure to a heat higher than 20° C. Moreover, while such slices are being dried, which must necessarily be done with a low heat and which is consequently very slow, they are liable to putrifaction. Thus, it is practically impossible to prepare gelatin in the summer time. Again, if the air is too dry, slices of solidified gelatin dry very irregularly and get crumpled, which not only impairs the appearance, but makes them very liable to crack. Thus the dry season also is not adapted for the work of preparing gelatin. The time best adapted for preparation of gelatin is the season when the temperature is not high and the air not very dry; and if it is desired to continue the work throughout the year, a specially furnished drying room must be provided.

The present invention is an improvement on methods hitherto used, and the following is an example of carrying it into practice:—

A suitable skin, bone or fish gelatin producing material is treated with a dilute acid or a solution of an alkali and neutralized, and then gelatin is extracted therefrom by heating the same and causing hydrolysis therein. The crude gelatin thus extracted is then treated with sulfurous acid or a compound thereof, formalin, alum, or the like, and clarified and bleached; and then concentrated in a vacuum pan or any other suitable concentrating pan to a density of from 30 to 60%. The gelatin thus concentrated is then run in a thin sheet into a mold which is cooled to 20° C. or lower temperature and solidified. The thin sheets of gelatin thus solidified are taken off the mold and dried on a drying net in a temperature of 40° to 50° C.

According to this invention gelatin fluid concentrated to from 30 to 60% strength, solidifies in a mold cooled to 20° C. or lower temperature in three minutes and can be easily removed from the mold. When such thin sheets of gelatin are taken into the drying room, the surfaces thereof, being acted upon by the air, quickly get hardened, and they never fall down through the drying net, as is often the case in the methods hitherto known where gelatin is not concentrated to such a strength as is done in the present invention.

This invention is characterized by concentrating gelatin fluid extracted, bleached and clarified by any suitable known process, to a thickness of from 30 to 60%; solidifying the concentrated fluid by a casting method into thin sheets, and drying these thin sheets by exposing them to a temperature not lower than 40° C. The above described stages of process are correlated to one another, and as a whole constitute the invention. The reason why gelatin fluid is concentrated to such a great thickness as has been stated, is this, that if it is not so concentrated, it is impossible to dry the thin sheets solidified therefrom quickly and at a temperature higher than the temperature favorable to the growth of putrifying organisms.

The gelatin sheets prepared according to my invention are rich in luster and viscosity, and perfectly transparent.

I claim:—

1. A process of preparing gelatin characterized by concentrating in a vacuum pan, or any other suitable evaporator, the gelatin fluid, extracted from any suitable gelatin producing material, bleached and clarified, to from 30 to 60% strength; and in drying in a temperature not lower than 40° C. after solidifying the same into thin sheets by casting it in a mold, substantially as and for the purposes hereinbefore set forth.

2. A process of preparing gelatin characterized by concentrating in a vacuum pan, or any other suitable evaporator, the gelatin fluid, extracted from any suitable gelatin producing material, bleached and clarified, to from 30 to 60% strength, and in drying in a temperature not lower than 40° C. after solidifying the same into thin sheets by casting in a mold which is cooled to 20° C. or lower temperature, substantially as and for the purposes hereinbefore set forth.

In testimony whereof I have signed my name to this specification in the presence of two subscribing witnesses.

TAMETARO TADA.

Witnesses:
HARVEY F. OLTMAUS,
YOSHIO KAWADA.